April 17, 1962 A. C. SCHROEDER 3,030,436

COLOR SYNCHRONIZING APPARATUS

Original Filed Jan. 5, 1952 2 Sheets-Sheet 1

INVENTOR
Alfred C. Schroeder
BY
ATTORNEY

INVENTOR
Alfred C. Schroeder
BY
[signature]
ATTORNEY

United States Patent Office 3,030,436

Patented Apr. 17, 1962

3,030,436

COLOR SYNCHRONIZING APPARATUS

Alfred C. Schroeder, Southampton, Pa., assignor to Radio Corporation of America, a corporation of Delaware Continuation of application Ser. No. 265,084, Jan. 5, 1952. This application June 8, 1961, Ser. No. 119,012
13 Claims. (Cl. 178—5.4)

The present invention relates to apparatus for synchronizing an oscillator in a receiver with a series of recurrent bursts of alternating current energy having a desired phase and frequency. This application is a continuation of my patent application, Serial No. 265,084, filed January 5, 1952, now abandoned.

A color television system has been proposed in which the color information is carried by a subcarrier having a phase representing hue and an amplitude representing chroma or saturation. In order to detect the phase of the subcarrier at a receiver and hence determine the hue to be reproduced in the color image, it is necessary to provide a source of waves having a standard or known phase. Generally this source takes the form of an oscillator and various means have been suggested for synchronizing this oscillator with bursts of standard frequency that are injected into the normal television signal. In these receivers signals are provided to different color channels by modulating differently phased outputs of the oscillator in the receiver with the received signal. In some of the previously suggested synchronizing arrangements the circuits have employed separate phase comparison devices which may have inherent errors.

Therefore, the object of the present invention is to provide an improved means for synchronizing an oscillator of a color receiver in which the output of the oscillator is applied to means for detecting the phase of an incoming subcarrier wherein the synchronizing arrangement includes the normal operating circuits of the receiver and minimizes the addition of separate circuits that may induce inherent errors.

The manner in which this objective may be attained may be briefly set forth as follows. The bursts have a known and fixed phase and therefore when they are applied to two different phase detectors employed to extract the color information, they themselves will produce voltages having a fixed ratio if the oscillator to which the phase detectors are coupled has the proper phase and frequency. If however this oscillator should drift in phase, the ratio of the voltages supplied by the two phase detectors will vary from this predetermined amount and this variation may be employed to control the phase of the oscillator.

The invention will be more clearly understood after a detailed consideration of the drawings in which.

Figure 1:
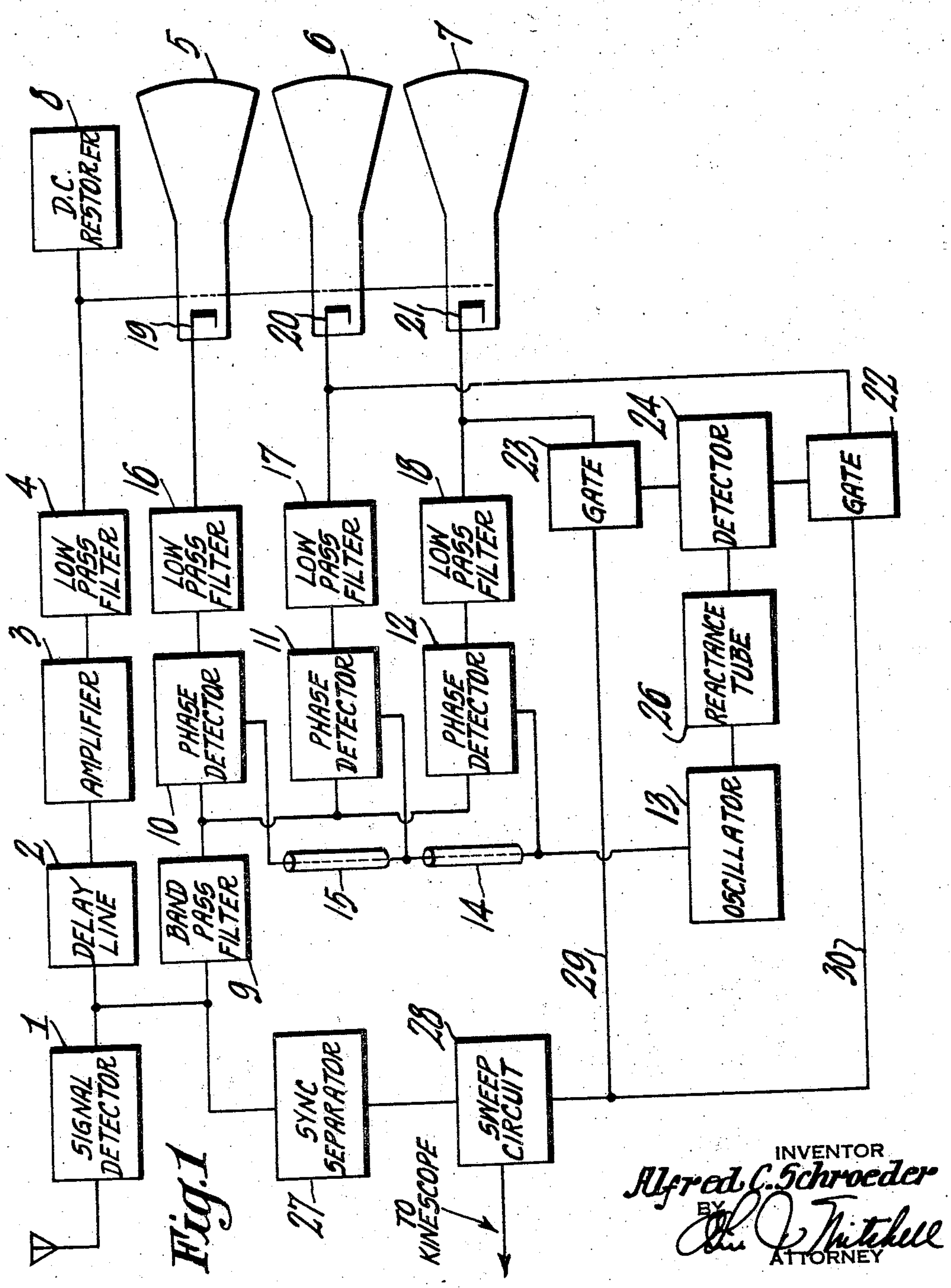
FIGURE 1 is a block diagram illustrating the embodiment of the present invention in a color receiver of the type described above.

In the color receiver shown in FIGURE 1 the video modulations of the main carrier are detected by any standard detector 1 and are applied by a delay line 2, an amplifier 3, and a low pass filter 4 to the grids of cathode ray devices 5, 6 and 7 adapted to separately reproduce each of the selected component colors. The proper D.C. level for these signals is set by a D.C. restorer 8 of a known type. Inasmuch as the signals are coupled to all three grids they produce brightness variations in the final image and in color variations.

In the particular system with which this receiver is designed to work the color information is carried by the high frequency portion of the video signals supplied by the signal detector 1. This high frequency portion is selected by a band pass filter or a high pass filter 9 and supplied to each of three phase detectors 10, 11 and 12. The phase detectors may take many different forms but in general they are modulators in which different phases of a carrier supplied by an oscillator 13 are modulated by the video signals passed through the filter 9. The output of the oscillator 13 is applied directly to the phase detector 12 via a delay line 14 to a phase detector 11 and via the delay line 14 and another delay line 15 to the phase detector 10. The products of modulation produced at the output of the phase detector 10 by the high band of video signals are low frequencies. These low frequencies are selected by low pass filters 16, 17 and 18 respectively and are coupled to the corresponding cathodes 19, 20 and 21. If the phase detectors 10, 11 and 12 are balanced against the carrier and against the modulating video signals then the band pass filter 9 and the low pass filters 16, 17 and 18 might be omitted. The important feature is however that the color information carried by the high frequency video signal is detected by the phase detectors 10, 11 and 12 and applied as low frequency information to the cathodes 19, 20 and 21.

The high frequency portion of the video signals was originally derived by modulating different phases of a frequency that is the same as the output frequency of the oscillator 13 with different low frequency color signals. Therefore, if the delay lines 14 and 15 are properly adjusted, the phases supplied by the oscillator 13 to the phase detectors 10, 11 and 12 correspond in phase to the phases of this same frequency that was modulated at the transmitter. Therefore, the modulations present in the different phases of the transmitter are then detected by the phase detectors 10, 11 and 12. This color information that is applied to the cathodes of the kinescopes is combined with the brightness information previously described so as to produce color signals of the proper intensity. It can therefore be seen that the proper operation of this receiver is only secured when phases of the frequency supplied by the oscillator 13 to the phase detectors 10, 11 and 12 coincide with the phases in which the various color information signals were modulated at the transmitter.

The manner in which the present invention fulfills this requirement is as follows. As previously stated, the synchronizing information is generally comprised of bursts of a frequency having a fixed phase relationship with respect to the different phases of oscillator frequency that are modulated by the color information at the transmitter. Therefore each of the phase detectors 10, 11 and 12 will provide a give D.C. voltage or pulse of a given amplitude in response to each burst of synchronizing signal. The amplitude of this pulse will depend upon the phase relationship between the burst and the output of the oscillator 13 applied to the particular phase detector. In general it can be said that if there is an in-phase relationship that the pulse will be a maximum amplitude if there is an out-of-phase relationship that the pulses will have a minimum amplitude. Therefore, if the phase relationship between the burst and the phases of the oscillator frequency supplied to the phase detectors 11 and 12 is proper the amplitude of the pulses produced by the detectors 11 and 12 in response to the burst of synchronizing energy will have a fixed and known ratio. These pulses are of line frequency if the burst is placed on the back porch of the horizontal blanking pulse and therefore they pass through the low pass filters 17 and 18.

Various means may be provided for separating out the pulses thus produced from the responses of the phase detectors 11 and 12 to the other portions of the video signal train, but in the present illustration the pulses that appear at the output of the low pass filter 17 are selected by a normally closed gate 22 that is open only during the burst interval. The pulses that appear at the output of the low pass filter 18 are selected by a similar type of gate 23.

Whatever arrangements are used for the separation of the pulses produced by detecting the burst in two different phase detectors, these pulses are applied to an amplitude detector 24 that serves to subtract one from the other. The detector 24 may be a balanced arrangement or it may be one in which different amplitudes or pulses separated by the gates 22 and 23 produce zero voltage. The matter of whether the detector 24 should be balanced or unbalanced will be considered in greater detail in connection with FIGURES 2 and 3. The output of the differential detector 24 may be employed in any well known fashion to control the phase of the oscillator 13 in the arrangement shown. However, the output of the detector 24 is applied so as to control the conduction of a reactance tube 26 that serves to tune the oscillator 13.

The gates 22 and 23 may be rendered capable of passing signals only during the blanking interval in the following manner. The output of the signal detector 1 is supplied to a sync separator circuit 27 of standard design and the vertical and horizontal sync pulses are supplied by the sync separator to standard sweep circuits 28. If the bursts are placed on the back porch of each line blanking pulse, the gates may be opened in response to the fly-back pulse appearing in the horizontal sweep circuits. These pulses are supplied to the gates via leads 29 and 30 respectively.

Figure 2:
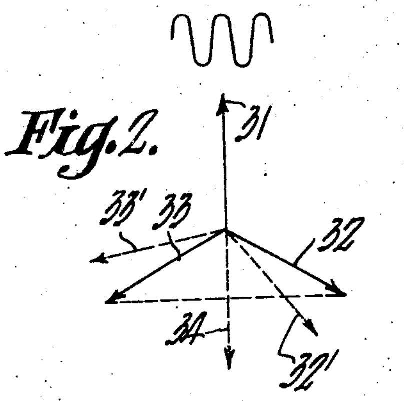
FIGURES 2 and 3 are vector diagrams useful in the explanation of the operation of the apparatus.
Figure 3:
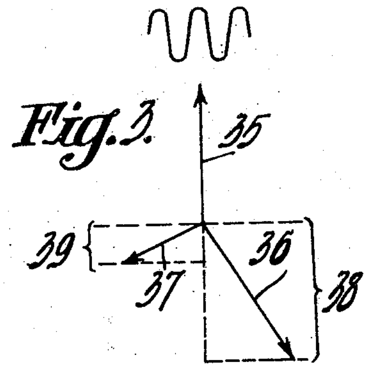

The overall operation of the invention as illustrated in FIGURE 1 may be more clearly understood after a consideration of the vector diagrams of FIGURES 2 and 3. Let us assume that the vector 31 indicates the phase of the burst of synchronizing energy, and that the vectors 32 and 33 represent the phases of the oscillator 13 that are applied to the phase detectors 11 and 12 respectively. The amplitude of the pulse produced in response to the burst by any phase detector may be determined by projecting the vectors representing the phase of the oscillator 13 supplied to that phase detector upon the vector representing the phase of the incoming burst. Thus if the vectors are 90° out of phase the output of the phase detectors will be zero. If the vectors become in-phase the amplitude of the pulse may be said to increase in a positive direction, and conversely if the vectors become more and more out of phase from the 90° position the pulses get larger in a negative direction. In the arrangement of FIGURE 2 it is assumed that the vectors 32 and 33 represent the proper phases of the output of the oscillator 13 supplied to the phase detectors 11 and 12 and that they are symmetrically phased with respect to the burst. Thus the pulses produced by the phase detectors 11 and 12 are both seen to have an amplitude indicated by the dotted line 34. Therefore, in this particular arrangement, the pulse produced by the phase detectors 11 and 12 in response to the burst are equal in amplitude and the output of the amplitude differential detector 24 may be zero.

However, it is not necessary that the burst be symmetrically phased with respect to the desired phases supplied by the oscillator 13 to the phase detectors 11 and 12. For example, in FIGURE 3 a phase of the burst is indicated by a vector 35, the phase of the phase detector 11 is indicated by vector 36 and the desired phase of the phase detector 12 is indicated by the vector 37. The amplitude of the pulse produced in response to the burst at the phase detector 11 will therefore be proportional to the dotted line 38 which represents the projection of the vector 36 on the vector 35, and the amplitude of the pulse produced by the phase detector 12 in response to the pulse 1 indicated by the dotted line 39 that is the projection of the vector 37 on the vector 35. It is seen therefore that the pulse provided by the phase detector 11 greatly exceeds the amplitude of the pulse supplied by the phase detector 12. Therefore, the amplitude differential detector 24 must be unbalanced so that the application of these pulses of different amplitude will produce zero output. Suppose however that in the arrangement shown in FIGURE 2 the phase of the oscillator frequency supplied to the phase detectors 11 and 12 is symmetrical with respect to the burst frequency and that the oscillator drifts in phase so that the vector 32 assumes the position 32′ and that the vector 33 shifts in the same direction to a position 33′. It can now be seen that the projection of these two vectors on the vector 31 are unequal, consequently the detected bursts supplied by the phase detector 11 are greater than the detected bursts supplied by the phase detector 12. This differential in amplitude between the detected bursts is then applied to the reactance tube 22 so as to speed up the oscillator.

Figure 4:
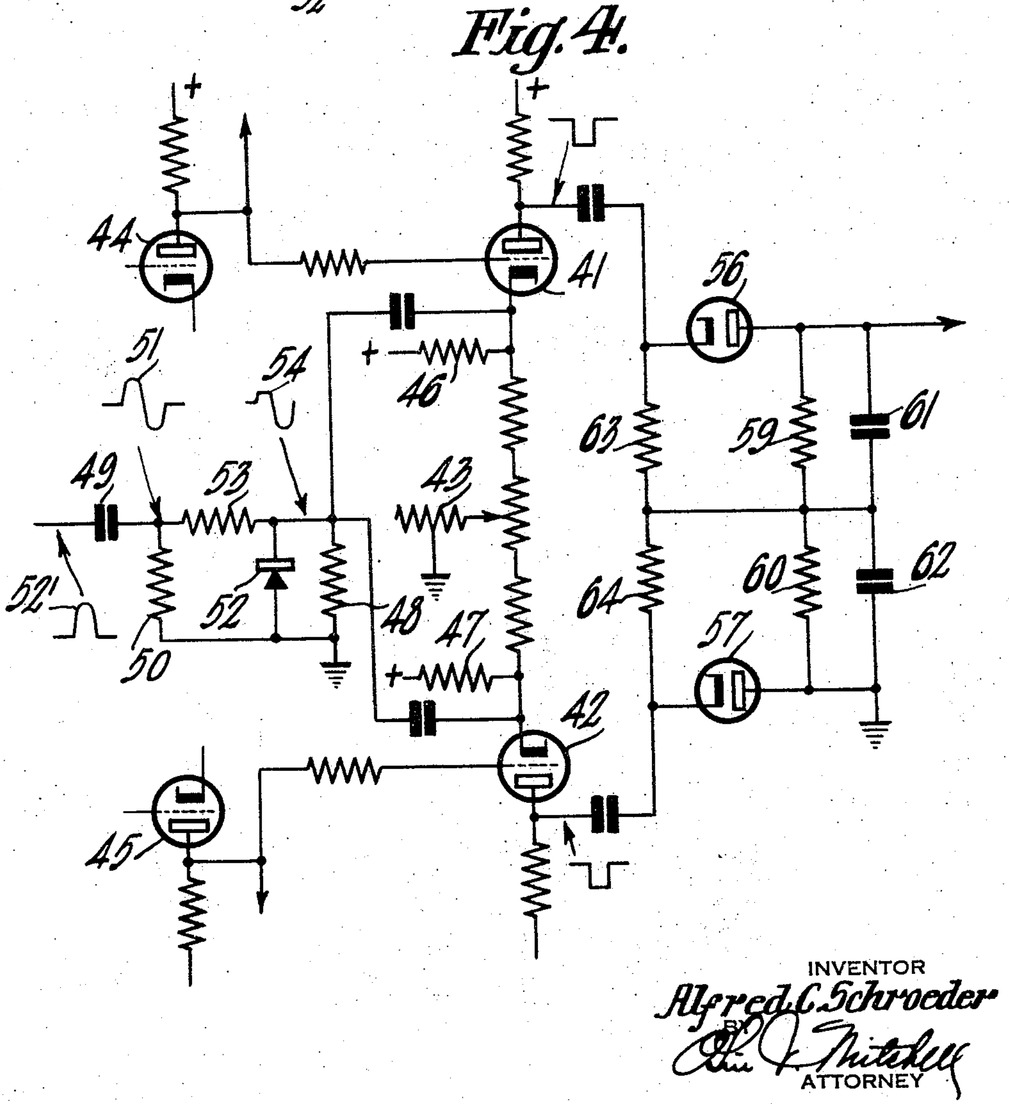
FIGURE 4 illustrates the circuit details of the means employed to detect amplitude differences between the responses of two different phase detectors to the burst frequency.

FIGURE 4 illustrates the details of the circuits employed for gating the bursts from the signal train and for producing a phase control voltage wave that is indicative of the difference in amplitude between the detected bursts. The cathodes of a pair of amplifiers 41 and 42 are connected together by a series of resistors. A variable contact 43 connects a desired point of one of the resistors to ground. When this contact is set at a neutral position, the resistance in the cathode or path of each of the amplifiers is the same and the gain of the two amplifiers is likewise the same. When, however, it is desired to unbalance the amplifiers 41 and 42 the contact 43 is moved so as to make the cathode resistance of one amplifier greater than the other. No further detailed explanation of this is presented as it is felt that the effect of such a contact on the gains of the amplifiers is well understood by those skilled in the art.

The output of the low pass filter 17 is coupled to an amplifier 44 and the output of the low pass filter 18 is coupled to an amplifier 45. The output of the amplifier 44 is coupled to the cathode 20 and the output of the amplifier 45 is coupled to the cathode 21. These outputs are also coupled to gating tubes in the form of amplifiers 41 and 42. These tubes are maintained at normal cutoff by the positive voltage placed on their cathodes via the resistors 46 and 47.

The gating tubes 41 and 42 may be rendered capable of passing the detected bursts appearing at the output of the low pass filters by applying negative flyback pulses to the cathodes of the amplifiers 41 and 42. Another way of keying the gating tubes 41 and 42, during the burst interval is illustrated in FIGURE 4. The cathodes of the tubes 41 and 42 are coupled via condensers to the upper end of a resistor 48, the lower end of the resistor being connected to ground. The horizontal sync pulses that are separated out in the receiver by standard sync separating means are applied to a circuit comprised of a condenser 49 and a resistor 50 so as to produce a wave 51 from a sync pulse 52. The differentiated wave 51 that thus appears across the resistors 50 is coupled to a rectifier 52 via a resistor 53 so that only the negative portion of the differentiated wave 51 appears across the resistor 48 as such a wave is indicated by the numeral 54. These negative pulses are applied to the cathodes of the gating tubes 41 and 42 and render them conductive. The amount of conduction and therefore the amount of gain produced in response to the pulse 54 is determined by the setting of the contact 43. The pulse produced, in response to the burst by the phase detector 11 appears at the output of the gating tube 41 with a negative polarity, and the pulse provided by the phase detector 12 in response to the burst appears in negative polarity at the output of the gating tube 42. These pulses are applied push-pull fashion to the cathodes of unilateral conducting devices 56 and 57. The plates of the unilateral conducting devices are also connected in push-pull via RC circuits comprised of resistors 59 and 60 and condensers 61 and 62. The plate of the unilateral conducting device 57 is connected to ground. If the pulses supplied by the gating tubes 41 and 42 have equal amplitude, the unilateral devices 56 and 57 conduct the same amount and the charges built up on the condensers 61 and 62 are of equal or opposite polarity so that the voltage at the plate of the unilateral device 56 is at ground potential. However, if the pulses supplied by the gating tube 41 have a greater amplitude than those supplied by the gating tube 42, the unilateral device 56 conducts more than the unilateral device 57 and the negative charge built up on the condenser 61 is greater than the negative charge built up on the condenser 62. As these charges oppose each other, the voltage produced on the condenser 61 more than compensates for the voltage produced across the condenser 62 and the plate of the unilateral device 56 becomes negative with respect to ground. If the pulses supplied by the gating tubes 42 have a greater amplitude than the pulses supplied by the gating tube 41, the reverse situation obtains and the plate of the unilateral device 56 becomes positive with respect to ground. It will be understood that other potentials than ground may be applied to the plate of the unilateral device 57.

What is claimed is:

1. In a color television system wherein the color information is conveyed in a higher frequency range of a television signal by a subcarrier that changes phase and amplitude with respect to a given standard in accordance with the color information being transmitted and wherein bursts of a wave of the same frequency and having a constant phase relationship to said standard is transmitted in said higher frequency range at line scanning frequency, a color synchronizing circuit comprising in combination, a plurality of synchronous detectors, means to apply only said higher frequency range of said television signal to said plurality of synchronous detectors, a signal source to develop different phases of a reference signal having said subcarrier frequency, means to apply each of said different phases of said reference signal to a different one of said plurality of synchronous detectors, a first and second normally closed gating circuit, means coupling each of said gating circuits to the output of a different one of said synchronous detectors, means operating at a line repetition rate for rendering said gating circuits capable of passing signals only during the times said bursts are applied to said synchronous detectors, means for deriving a control voltage proportional to the algebraic differences between the amplitudes of the voltage outputs of said gating circuits, and means for controlling the phase of the signal source with said control voltage.

2. In a color television receiver adapted to receive a color television signal having a higher frequency range including both a color subcarrier having a given frequency and subject to modulation in accordance with color information and also bursts of subcarrier frequency at a standard phase of said given frequency, said bursts occurring only during periodically recurring line retrace intervals and said color subcarrier being subject to modulation in accordance with color information only during periodically recurring line scanning intervals intervening said line retrace intervals, a burst synchronizing circuit comprising in combination, a plurality of synchronous detectors each having an output circuit, bandpass filter means to filter said higher frequency range from said color television signal and to apply the color subcarrier and bursts developed therefrom to said plurality of synchronous detectors, a signal generator to develop a reference signal having the frequency of said color subcarrier, means to apply different phases of said reference signal to said plurality of synchronous detectors, color information utilization means coupled to the output circuits of said plurality of synchronous detectors and responsive to color information recovered from said modulated color subcarrier during said periodically recurring line scanning intervals, a first and second normally-closed gate circuit, each of said gate circuits coupled to a different one of said plurality of synchronous detectors, means effective only during said periodically recurring line retrace intervals for opening said gate circuits during the time intervals that said bursts are applied to said synchronous detectors, an amplitude comparison device for subtracting the output of one gating device from another to provide a phase-indicative signal indicative of the phase relationship of the phases of said reference signal and said bursts, and means for controlling the frequency and phase of the reference signal output of said signal generator responsive to said phase-indicative signal.

3. Apparatus as described in claim 2 wherein said amplitude comparison device is such as to produce zero output when the outputs of the gate circuits have a predetermined ratio differing from unity.

4. In a color television receiver adapted to receive a color television signal having a higher frequency range including a chrominance signal and also bursts of color synchronizing information having standard frequency and phase, said bursts occurring during periodically recurring line retrace intervals, a synchronizing circuit comprising in combination, a signal source to develop a plurality of reference signals of different phase, each at said standard frequency, signal detecting means responsive to said reference signals and to only said higher frequency range of said color television signal to develop during said recurring line retrace intervals a plurality of detected signals related to the phase difference between the phases of said plurality of reference signals and said bursts and to develop during the recurring periods intervening said recurring line retrace intervals a plurality of detected signals representative of chrominance information, means operatively coupled to said signal detecting means only during said recurring line trace intervals for subtracting a pair of said detected signals to form a control signal, and means responsive to said control signal for controlling the phases of said plurality of reference signals.

5. Apparatus as described in claim 4 wherein said subtracting means is unbalanced so that the control signal is zero for a predetermined ratio differing from unity between the outputs of said signal detecting means during the burst interval.

6. In a color television system adapted to receive a color television signal wherein the color information is conveyed by a higher frequency subcarrier that changes with respect to a given standard in accordance with the color information being transmitted and wherein bursts of a wave of the same frequency and having a constant phase relationship to said standard is transmitted at line scanning frequency, said bursts being transmitted during periodically recurring horizontal blanking intervals, the combination of, a plurality of synchronous detectors, an oscillator of subcarrier frequency, means to apply differently used phased outputs of said oscillator to said plurality of synchronous detectors, means to apply the subcarrier and burst portion of the received signal to each of said plurality of synchronous detectors to detect the color information represented by the bursts relative to the phases of each of said outputs, signal sampling means rendered capable of developing sampled outputs only during said recurring horizontal blanking intervals and utilized for sampling the output of each of said plurality of synchronous detectors during said bursts, means for comparing said sampled outputs during said bursts whereby a control voltage is produced which is proportional to the algebraic difference between the amplitudes of said sampled outputs and means for utilizing said control voltage for controlling the frequency and phase of said oscillator according to the frequency and phase prescribed by said burst.

7. In a color television system wherein the color information is conveyed by a subcarrier that changes with respect to a given standard in accordance with the color information being transmitted and wherein bursts of a wave of the same frequency and having a constant phase relationship to said standard is transmitted at line scanning frequency, said bursts being transmitted during periodically recurring horizontal blanking intervals, the combination of, a plurality of synchronous detectors, an oscillator of subcarrier frequency, means to apply differently phased outputs of said oscillator to said plurality of synchronous detectors, means to apply the portion of the received signal comprising said subcarrier and said bursts to the exclusion of a lower frequency portion of said received signal to said plurality of synchronous detectors to detect phase information represented by the bursts in each synchronous detector during said recurring horizontal blanking intervals and to detect said color information during the recurring periods intervening said recurring horizontal blanking intervals, signal comparison means, means effective only during said recurring horizontal blanking intervals for utilizing said signal comparison means for comparing the output of each of said plurality of synchronous detectors during said bursts, means for deriving a control voltage therefrom which is proportional to the algebraic difference between the amplitudes of said outputs, and means for utilizing said control voltage for controlling the frequency and phase of said oscillator according to the frequency and phase prescribed by said burst.

8. In a color television receiver adapted to receive a television signal wherein the amplitude of different phase components of a color subcarrier at a subcarrier frequency form part of a composite signal of video information, said television signal also including bursts of reference phase information, said bursts having said subcarrier frequency and occurring during each line retrace interval, the combination of, a plurality of phase detectors, an oscillator to develop an output signal at substantially the frequency of said subcarrier, means to apply the portion of said television signal comprising said subcarrier and bursts to the exclusion of a lower frequency portion of said received signal to said phase detectors, means to apply one of different phases of the output signal of said oscillator to each of said phase detectors, a first sampling means coupled to a first of said plurality of phase detectors and adapted to sample the output of said first phase detector during the recurring line retrace intervals, a second sampling means coupled to a second of said plurality of phase detectors and adapted to sample the output of said second phase detector during the recurring line retract intervals, an amplitude comparing device coupled to said first sampling means and said second sampling means to provide a phase control signal responsive to the amplitude of the signals provided by said first sampling means and said second sampling means, said amplitude comparing device having a time constant that is long with respect to a line scanning interval so that said phase control signal substantially retains the value established during the presence of each burst during the following line interval, and means for utilizing said phase control signal for controlling the frequency and phase of said oscillator.

9. A control system for a color television receiver comprising: a circuit for supplying a composite video frequency signal comprising during recurring line scanning intervals a color television wave signal amplitude modulated at different phase points by individual ones of signals representative of a plurality of colors and during intervening line retrace intervals a color synchronizing signal having a phase related to a reference phase of said wave signal; a signal generator for generating a signal harmonically related in frequency to said wave signal and which has a phase which tends to vary from a predetermined phase relation with respect to said reference phase; a bandpass filter for selectively passing said modulated wave signal and said color synchronizing to the exclusion of lower frequency components of said composite signal; a control apparatus including a single detection device and a control circuit coupled in cascade, the input circuit of said detection device being coupled to said supply circuit by means of said bandpass filter and being coupled to said generator and said detection device being responsive jointly during said recurring line scanning intervals to said wave signal and said generated signal for deriving a signal representative of the modulation component of said wave signal at a preselected phase point with respect to said reference phase and being responsive jointly during said intervening line retrace intervals to said color synchronizing signal and said generated signal to develop an error signal representative of the relative phases of said generated signal and said color synchronizing signal, said control circuit being responsive to said error signal to derive during said intervening line retrace intervals a control effect representative of the said relative phases; and a control device coupled to said signal generator and said control apparatus and responsive to said control effect for maintaining the phase of said generated signal substantially at said predetermined phase relation.

10. A control system for a color television receiver comprising: a circuit for supplying a composite video frequency signal comprising during recurring line scanning intervals a color television wave signal amplitude modulated at different phase points by individual ones of signals representative of a plurality of colors and during intervening line retrace intervals a color synchronizing signal having a phase related to a reference phase of said wave signal; a signal generator for generating a signal equal in frequency to said wave signal and which has a phase which tends to vary from a predetermined phase relation with respect to said reference phase; a bandpass filter for selectively passing said modulated wave signal and color synchronizing signal to the exclusion of lower frequency components of said composite signal; a control apparatus including a single detection device and a control circuit coupled in cascade, the input circuit of said detection device being coupled to said supply circuit by means of said bandpass filter and being coupled to said generator and said detection device being responsive jointly during said recurring line scanning intervals to said wave signal and said generated signal for deriving a signal representative of the modulation component of said wave signal at a preselected phase point with respect to said reference phase, and being responsive jointly during said intervening line retrace intervals to said color synchronizing signal and said generated signal to develop an error signal representative of the relative phases of said generated signal and said color synchronizing signal, said control circuit being responsive to said error signal to derive during said intervening line retrace intervals a control effect representative of said relative phases; and a circuit coupled to said generator and said control apparatus and responsive to said control effect for maintaining the phase of said generated signal substantially at said predetermined phase relation.

11. A color television receiver for utilizing a color television signal which includes color difference components modulated on a subcarrier wave and which further includes recurring bursts of a signal having a selected phase and frequency with respect to said subcarrier, said bursts recurring at a line repetition rate, said receiver including in combination, apparatus for receiving the color television signal and for deriving the modulated subcarrier and the recurring signal bursts, detector means for recovering the modulation components of the aforesaid subcarrier in response to a demodulating signal having a frequency and phase corresponding to the frequency and phase of the aforesaid subcarrier, a selector network coupled to said apparatus for applying the modulated subcarrier and the recurring signal bursts to said detector means, said detector being subject to develop further signal components corresponding to the aforesaid signal bursts with amplitude variations related to phase variations between the aforesaid demodulating signal and subcarrier, apparatus for developing such a demodulating signal and for supplying the demodulating signal to said detector means, utilization means for the modulation components and the subcarrier coupled to said detector means, a control means coupled to said last mentioned apparatus for controlling the frequency and phase of the demodulating signal developed thereby, a circuit coupled to said detector means and actuated at said line repetition rate at the times of occurrence of the aforesaid bursts for developing a control signal having amplitude variations corresponding to amplitude variations of the aforesaid further signal components developed by said detector means, and means for applying said control signal to said control means for maintaining the frequency and phase of the demodulating signal developed thereby at values corresponding to the frequency and phase of the aforesaid subcarrier.

12. A color television receiver for utilizing a color television signal which includes color difference components modulated on a subcarrier wave and which further includes recurring bursts of a signal having a selected phase and frequency with respect to said subcarrier, said bursts recurring at a line repetition rate, said receiver including in combination, apparatus for receiving the color television signal and for deriving the modulated subcarrier and recurring signal bursts, detector means for recovering the modulation components of the aforesaid subcarrier in response to a demodulating signal having a frequency and phase corresponding to the frequency and phase of the aforesaid subcarrier, a selector network coupled to said apparatus for applying the modulated subcarrier and the recurring signal bursts to said detector means, said detector being subject to develop further signal components corresponding to the aforesaid signal bursts with amplitude variations related to phase variations between the aforesaid demodulating signal and subcarrier, apparatus for developing such a demodulating signal and for supplying the demodulating signal to said detector means, utilization means for the modulation components of the subcarrier coupled to said detector means and control means for utilizing the aforesaid further signal components developed by said detector means to control said last-mentioned apparatus and maintain the frequency and phase of the demodulating signal developed thereby at values corresponding to the frequency and phase of the aforesaid subcarrier.

13. A color television receiver for utilizing a color television signal which includes color difference components modulated on a subcarrier wave, and which further includes horizontal and vertical synchronizing components and recurring bursts of a signal having a selected phase and frequency with respect to said subcarrier, said bursts having a predetermined timing with respect to said synchronizing components and recurring at the repetition rate of said horizontal synchronizing components, said receiver including in combination, detector means for recovering the modulation components of the aforesaid subcarrier in response to a demodulating signal having a frequency and phase corresponding to the frequency and phase of the aforesaid subcarrier, a selector network responsive to said color television signal for selectively applying the modulated subcarrier and recurring signal bursts to said detector means, said detector being subject to develop further signal components corresponding to the aforesaid signal bursts with amplitude variations related to phase variations between the aforesaid demodulating signal and subcarrier, apparatus for developing such a demodulating signal and for supplying the demodulating signal to said detector means, a control means coupled to said lastmentioned apparatus for controlling the frequency and phase of the demodulating signal developed thereby, a network for utilizing the aforesaid synchronizing components to develop a gating signal having said horizontal repetition rate and recurring at times corresponding to the occurrence of the aforesaid bursts, a circuit responsive to said gating signal for selecting the further signal components developed by said detector means to produce a control signal having amplitude variations corresponding to amplitude variations of the aforesaid further signal components, and means for applying said control signal to said control means for maintaining the frequency and phase of the demodulating signal developed by said last-mentioned apparatus at values corresponding to the frequency and phase of the subcarrier.

References Cited in the file of this patent

UNITED STATES PATENTS

| | | |
|---|---|---|
| 2,452,575 | Kenney | Nov. 2, 1948 |
| 2,458,156 | Fredendall | Jan. 4, 1949 |
| 2,666,806 | Kalfaian | Jan. 19, 1954 |
| 2,754,356 | Espenlaub | July 10, 1956 |
| 2,766,321 | Parker | Oct. 9, 1956 |